June 3, 1969  F. F. MILLER, JR  3,447,341
BALL CAGE FOR BALL TYPE CONSTANT VELOCITY JOINT
Filed Dec. 19, 1966

INVENTOR.
FRED F. MILLER, JR.
BY Harold D. Steel
Richard B Farley
Walter E. Pavlick
ATTORNEYS

United States Patent Office 3,447,341
Patented June 3, 1969

3,447,341
BALL CAGE FOR BALL TYPE CONSTANT VELOCITY JOINT
Fred F. Miller, Jr., Sylvania, Ohio, assignor to Dana Corporation, Toledo, Ohio, a corporation of Virginia
Filed Dec. 19, 1966, Ser. No. 602,875
Int. Cl. F16d *3/30;* F16c *19/20, 33/38*
U.S. Cl. 64—21                                                   10 Claims This invention pertains in general to ball type constant velocity joints, in which the torque transferring drive balls are movable relative to the driven and drive members thereof, and particularly to a new and useful improvement thereof in regard to the ball cage member used to maintain the torque transferring means in a single plane.

It is well known in the art that to provide a transfer of torque at a constant velocity from one shaft member to the other in a universal joint, which shaft members are capable of being angularly disposed relative to one another, it is generally required that an intermediate revoluble member be drivingly connected between the outer and inner members of the joint. This intermediate revoluble member should be arranged so that any individual constituents thereof lie in a single plane, and such that this plane bisects the angle formed by the outer and inner members. In ball type constant velocity joints, a plurality of drive balls constitute the intermediate revoluble member, and, in the usual construction of this type of joint, these balls are generally interpositioned in opposing grooves in the outer and inner members of the joint.

This invention is applicable to universal joints which depend on an intermediate ball cage member for maintaining the drive balls in a single planar relationship.

The usual ball cage is a truncated spherical shell having a plurality of circumerentially spaced ball accommodating openings, each of which generally has an axial extent so that the portions of the cage surrounding the openings closely embrace the individual drive balls in a relatively tight fit to hold the balls in a single plane relative to each other. These openings, are usually rectangular with short rounded circumferentially facing ends and straight axially facing sides. When torque is transferred between the inner and outer joint members, any resultant axial forces imposed on the drive balls is restricted by the reaction of the drive balls against the respective axial sides of these circumferentially spaced openings in the ball cage member. Because of this arrangement any displacement of the drive balls is effected in conjunction with the ball cage member as a planar unit. In the usual construction, the ball cage member does allow a radial movement of the drive balls, and some allow a limited axial movement of the drive balls as a unit relative to the inner and outer joint members.

The sides of the cage openings are subjected to heavy wear, and since the action and reaction force vectors between the drive balls and the ball cage members are predominantly oriented in a direction parallel to the central axis of the ball cage member, the axially facing sides of the ball cage member take substantially all of this wear. In contacting the flat axially facing sides of prior art ball cage openings, the drive balls, under loading conditions, engage these sides at a substantially tangential contact point, and because of this, a wear depression occurs at the usual point of contact which weakens the cage member and produce noises in the operation of the universal joint.

One general solution to the above problem in the prior art has been the use of a thicker cage member for increasing the total surface area of each axially facing side, thereby rendering the ball cage member stronger. This approach, however, has not alleviated the noise problem as the wear depressions are not eliminated, and in addition, the use of such a thicker cage member has the effect of interfering to a certain extent with the angular and axial movements of the joint. Thus, it is an object of this invention to reduce the noise and wear problems in the operation of a ball type constant velocity joint using an annular ball cage member. It is a further object of this invention to set forth a ball cage member for ball type constant velocity universal joints which will contact the drive balls over a greater surface area. Another object of this invention is to provide a ball cage construction for ball type constant velocity joints which will render improved and economic constant velocity universal joint performances. Still another object of this invention is to set forth a ball cage member for a constant velocity universal joint which will have a relatively longer operating life than those found in the prior art.

Other and further objects of this invention will become apparent from the following detailed description taken in conjunction with the accompanying drawings in which.

Figure 1:
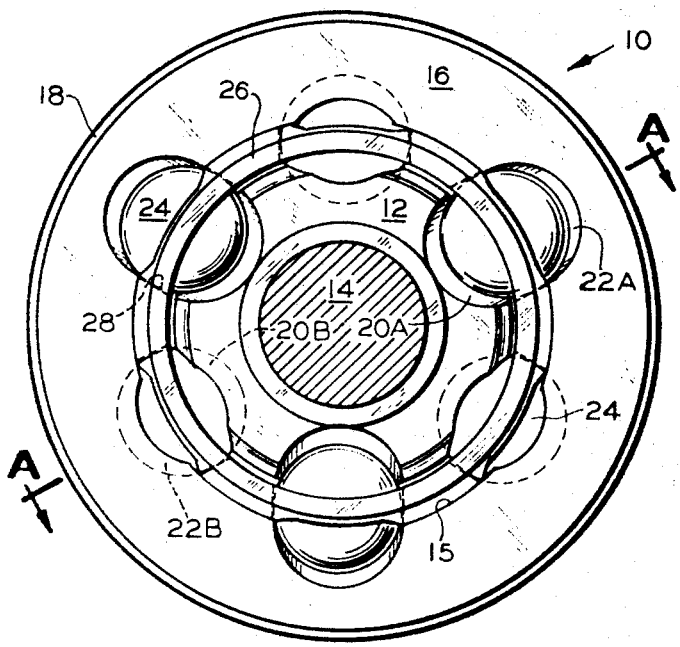
FIG. 1 is an end elevational view of a universal joint embodying this invention with portions shown in section.

In general, the invention set forth herein is applicable to constant velocity universal joints utilizing drive balls between an outer joint member and an inner joint member positioned in an axially extending opening of the outer joint member. The inner and outer joint member are constructed to move axially and angularly relative to one another, and both of these joint members each have a plurality of grooves for accommodating the intermediate drive balls. The grooves on the inner joint member are mated with individual grooves in the outer joint member in an intersecting and mirror-image relationship with individual drive balls being disposed in the mating grooves. The inner and outer joint members are assembled so that some of the mating grooves converge towards one end of the assembled members and the others converge towards the other end, that is, the mating grooves are inclined oppositely. An annular ball cage member is disposed between the inner and outer joint member, and has a plurality of circumferentially spaced ball-accommodating openings therein for receiving the respective drive balls. This cage member serves as the means for keeping the drive balls from moving axially relative to one another thereby holding them in substantially a single planar relationship desired for constant velocity torque transmission.

Referring now to the drawings, a ball type constant velocity universal joint is indicated at 10, which joint has an inner joint member 12 conventionally connected to a shaft 14. The inner joint member 12, forming either the drive or driven member, is shaped like a truncated sphere and positioned in a radially spaced relationship within an opening 15 of an outer joint member 16, the latter being conventionally attached to an appropriate extension 18 of another shaft.

Figure 2:
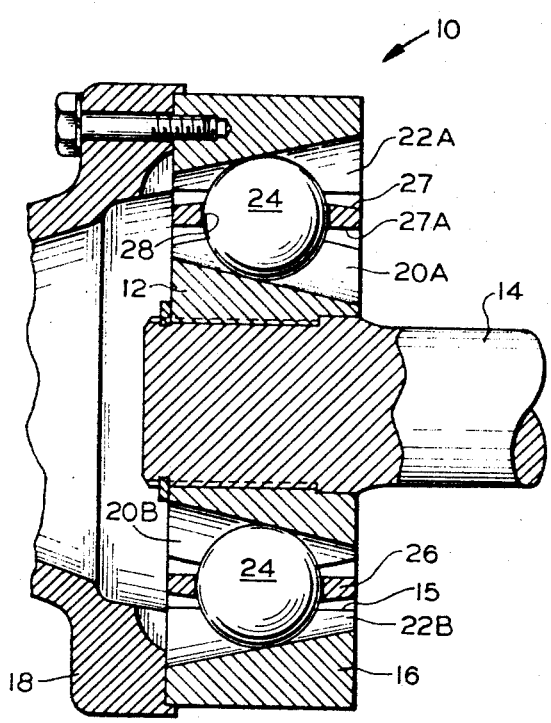
FIG. 2 is a sectional view taken along the line A—A in FIG. 1.

Disposed in the outer surface of inner joint member 12 are a plurality of grooves 20A and 20B having an arcuate cross-section and straight axes, however, alternate grooves in the inner joint member 12 are inclined toward a common point on the axis of the inner joint member, while the other grooves on the inner joint member are inclined oppositely to the first grooves and at the same angle. More specifically, the axes of the grooves 20A on the inner joint member 12, while extending axially, are inclined radially inwardly towards the right as shown in FIG. 2, while the grooves 20B, which are alternately spaced between the grooves 20A, extend axially and are inclined radially inward to the left.

The axially extending opening 15 in the outer joint member 16 is cylindrical and a plurality of grooves 22A and 22B are formed in the wall of the outer member surrounding the opening, which grooves are of similar construction to the grooves 20. As shown in FIG. 2, the grooves 22A, while extending axially, are inclined radially inwardly towards the left with respect to the longitudinal axis of the outer joint member 16, while alternately spaced between the foregoing grooves are the remaining grooves 22B, which extend axially and are inclined radially towards the right with respect to the longitudinal axis of the outer joint member. Furthermore, each of the grooves 22A and 22B are positioned so that it is in a mirror-image mating relationship relative to a groove 20A and 20B, respectively, in the inner joint member 12 to which it is opposed. While the preferred embodiment of this invention incorporates groove arrangements as set forth above, the inventive concept set forth herein may be used in conjunction with ball type constant velocity universal joints having other suitable groove arrangements.

Positioned between the inner joint member 12 and outer joint member 16 are a plurality of drive balls 24 for transferring torque therebetween. Each of these drive balls 24 is positioned in a space formed by a pair of mating opposing grooves 20A, 22A and 20B, 22B, with the total number of drive balls 24 being equal to the number of pairs of mating grooves. These drive balls 24 serve as the driving contact between the inner joint member 12 and outer joint member 16. Also positioned between the inner joint member 12 and outer joint member 16 is an annular ball cage member 26 in the shape of a truncated annular shell having an opening 28 for accommodating each of the drive balls 24, with the openings being circumferentially spaced from each other. The cage member 26, although it does come in contact with these joint members, theoretically has no reaction or action contact points with either joint member, its movement being a passive reaction of collective drive ball 24 movements in response to axial and angular positioning of the universal joint during torque transmission. The ball cage member 26 should have sufficiently thick walls in order that it can withstand the normal stresses placed thereon in a ball type constant velocity universal joint. In order to provide that the cage and the inner and outer members can accommodate relative axial movement, the external surface 27 of the ball cage member 26 is convex, that is, it is biconical, while the internal surface 27A thereof is cylindrical. By such construction, the outer and inner surfaces 27 and 27A of the ball cage member 26 can slidingly engage the inner cylindrical surface of the outer joint member 16 and the outer spherical surface of the inner joint member respectively in order to preclude binding of the joint during either relative angular or axial movement; it being understood that after a predetermined amount of angular movement, the outer surface 27 of the cage will limit further angular movement by the flat portion thereof engaging the outer race. If the cage is made with a spherical outer surface, such will not be the case. Further, the joint can be made fixed against axial movement by providing a spherical engagement between either the inner or outer race and the cage or both.

The cage 26 does not by itself determine the bisecting plane of the drive balls 24, rather the angular displacement of one joint member relative to the other and the urging forces on the balls by the opposing grooves causes the balls to move initially toward the necessary bisecting position; half the balls tending to move in opposite axial directions. The cage 26 restrains such opposite movement of the balls, thereby absorbing the axial forces and maintains the balls in the bisecting plane.

The circumferentially spaced openings 28 of the ball cage member 26 are constructed to accommodate individual drive ball members 24. Each opening 28 has a pair of axially facing walls 42A and 42B and a pair of circumferentially facing side walls 44A and 44B. The side walls 44A and 44B do not function to restrict the drive balls 24 from circumferential movement relative to one another, since the grooves 20 and 22 control such circumferential movement. Thus, the side walls 44A and 44B are spaced circumferentially from the balls 24 so that the circumferential distance between the balls can vary as necessary. The axially facing walls 42A and 42B are closely spaced with respect to the periphery of the balls 24 and restrain the latter from axial movement relative to one another, while in the radial direction, the walls are flat so that radial inward and outward movement of the balls can occur.

As mentioned previously, prior art embodiments of universal joint ball cage openings generally have axially facing walls which are flat both in the radial and circumferential directions. Since the ball moves radially inwardly and outwardly of the opening, as well as circumferentially thereof, a rather large area of the cage wall is subjected to wear; however, the contact, at any one instant, between the ball and the cage wall, is that of a sphere contacting a flat surface, so that an instantaneous concentrated high unit pressure load is obtained. In order to overcome this high unit pressure load which results in a wear problem, the invention as set forth herein utilizes a ball cage opening construction based on axially facing walls which are arcuately formed in the circumferential direction while extending straight from the outer surface of cage member 26 to its inner surface so as to be generally perpendicular to the ball cage axis.

Figure 3:
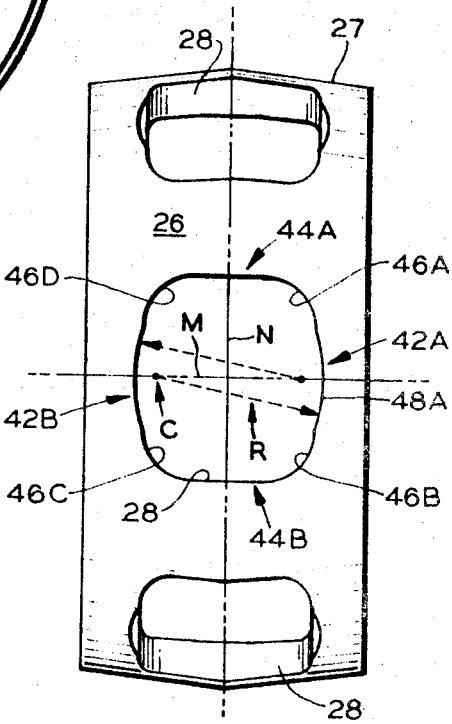
FIG. 3 is a side elevational view of the ball cage of the universal joint shown in FIG. 1.

In the embodiment of this invention shown in FIGS. 1–3 and as best seen in FIG. 3, the two axially facing walls 42A and 42B have been formed arcuately to provide more than point contact of the individual drive ball 24 with the respective axially facing side. More particularly, in looking radially inwardly at an opening 28, the portion of the axially facing walls 42A and 42B, which are adapted to engage the ball 24 received in the opening, are formed arcuately in the circumferential direction. The circumferentially facing sides 44A and 44B of each opening 28 are straight, and rounded corners 46A, 46B, 46C and 46D, connect the circumferential sides to the axial sides 42A and 42B. The corner 46A, as representative of the others, can be a square corner; however, to avoid stress concentration at the corner, the same preferably is formed by a 90° arc generated from a center within the opening 28. The actual shape of the circumferentially facing sides 44A and 44B and the corners 46A, 46B, 46C and 46D can be varied, so long as the cage is not unduly weakened and as long as the circumferential sides and corners do not interfere with any required circumferential movement of the balls 24. At the termination of the corner arc 46A in the side 42A, another arcuate section 48A is formed which extends axially further towards the respective axial edge of the cage than the axial extent of the above-mentioned corner arc. This arcuate section 48A forms the axially facing wall 42A. The radius of the arc 48A is shown by the dotted line R and is larger than the radius of the individual spherical drive ball members 24, and the arc center C lies on the minor axis M of the opening 28 at a position on the opposite side of the major axis N with respect to the arc 48A. The greater the size of the arc radius R, the closer the side wall 42A will become to being circumferentially straight and, at the same time, the contact area between the ball 24 and the wall will decrease in size. As R approaches the radius of the ball 24 and C approaches the intersection of the major and minor axes M and N, the greater the curvature of the arc 48A will become and the contact area between the ball and the wall will increase until such time as the arc center lies on the axes' intersection and R is substantially the same as the ball radius, at which time the contact area will be a maximum, that is, there will be complete engagement of the wall about the periphery of the ball.

However, complete peripheral engagement cannot be utilized with this universal joint, since it has been found that the balls 24 must shift circumferentially relative to each other; that is, the balls must be able to shift circumferentially relative to the cage opening 28 receiving the same. This circumferential shift results from tolerances which exist in the fit between the balls and the grooves 20 and 22 receiving the same and also from deflections and compressions of the various joint components.

To accommodate this shift, the axial distance between the walls 42A and 42B at the maximum shift points must be at least the same as the diameter of the balls received therein. Accordingly, since the walls 42A and 42B are arcuate, at the medial location of the walls (at the minor axis M) the distance between the walls will be greater than the radius of the balls. The greater the arc radius R, the lesser can be made the distance between the wall and the ball at the medial position for a given amount of circumferential shift, since the wall divergence will be less due to the decreased curvature of the arc. If the arc center is disposed on the intersection of the major and minor axes, then the arc radius must be sufficiently larger than the diameter of the ball to allow the required amount of circumferential shift.

The minimal desirable arc radius is one which is substantially the same as the radius of the ball. With such an arc radius, the arc center must be positioned on the same side of the major axis N of the opening that the wall formed by the arc is located so that circumferential shifting of the ball in the opening is possible. Accordingly, the circumferential walls 44A and 44B must be at least as far apart as the axial walls 42A and 42B.

In the preferred embodiment of this invention, the arc radius is slightly less than the diameter of the ball, the arc center is displaced on the opposite side of the major axis N from the wall generated thereby, and the major axis N is greater in size than the minor axis M. This gives the desired increased contact area while allowing for circumferential shift without an undesirable amount of space between the ball and the axial wall at the medial position.

While only one embodiment of this invention has been shown and described, it is apparent that many changes can be made therein which lie within the scope of this invention as defined by the following claims.

What is claimed is:

1. A constant velocity universal joint of the type having an inner member with ball receiving grooves therein, an outer member with an axial opening in which the inner joint member is received, the outer joint member having ball receiving grooves in the surface thereof surrounding the opening therein, each groove in the inner member disposed in a paired mirror-image relationship with a groove in the outer member, a drive ball positioned in each pair of grooves, and an annular ball cage positioned between said members and having ball receiving openings therein for holding the drive balls in a single plane, wherein the improvement comprises, each of said ball receiving openings having opposed axially facing wall portions formed arcuately in the circumferential direction, the axial distance between the medial portion of said opposed axially facing wall portions being substantially greater than the diameter of the ball received therein, each of said openings also having opposed circumferential facing wall portions which are so formed and sufficiently spaced for allowing the ball received in the opening to shift circumferentially relative thereto and relative to the axially facing wall portions.

2. A universal joint according to claim 1 wherein the distance between the opposed circumferential wall portions is greater than the distance between the opposed axial wall portions.

3. A universal joint according to claim 2 wherein the arc radius of said axial wall portions is greater than the radius of the ball to be received therein.

4. A constant velocity universal joint of the type having an inner member with ball receiving grooves therein, an outer member with an axial opening in which the inner member is received, the outer joint member having ball receiving grooves in the surface thereof surrounding the opening therein, each groove in the inner member disposed in a paired mirror-image relationship with a groove in the outer member, a drive ball positioned in each pair of grooves, and an annular ball cage positioned between said members and having ball receiving openings therein for holding the drive balls in a single plane, wherein the improvement comprises, each of said ball receiving openings having opposed axially facing wall portions formed arcuately in the circumferential direction with the arc radius of said axial wall portions being greater than the radius of the ball to be received therein, each of said openings also having opposed circumferentially facing wall portions with the distance therebetween greater than the distance between the opposed axial wall portions, said circumferentially facing wall portions being so formed and sufficiently spaced for allowing the ball received in the opening to shift circumferentially relative to the opening and relative to the axially facing wall portions, each of said openings having a circumferentially extending axis and an axially extending axis which are in an intersecting relationship, the arc center of said axial wall portions being disposed on the opposite side of the circumferential axis of an opening with respect to the wall portion formed from said center.

5. A universal joint according to claim 4 wherein the arc radius is closer in size with respect to the ball diameter than it is with respect to the ball radius.

6. A universal joint according to claim 5 wherein the walls of said openings in the radial direction with respect to the axis of said cage, are substantially flat.

7. A universal joint according to claim 6 wherein the opposed circumferential wall portions are joined to the opposed axial wall portions by a rounded corner, the axial extent of the portions of said openings adjacent the corner thereof being less than the axial extent of said openings in the medial position of the arcuate portions thereof.

8. A constant velocity universal joint of the type having an inner member with ball receiving grooves therein, an outer member with an axial opening in which the inner member is received, the outer joint member having ball receiving grooves in the surface thereof surrounding the opening therein, each groove in the inner member being disposed in a paired mirror-image relationship with a groove in the outer member, a drive ball positioned in each pair of grooves, and an annular ball cage positioned between said members and having ball receiving openings therein for holding the drive balls in a single plane, wherein the improvement comprises, each of said ball receiving openings having opposed axially facing wall portions formed arcuately in the circumferential direction, the axial distance between the medial portion of said opposed axially facing wall portions being greater than the diameter of the ball received therein, each of said openings also having opposed circumferentially facing wall portions which are so formed and sufficiently spaced for allowing the ball received in the opening to shift circumferentially relative thereto and relative to the axially facing wall portions, the axial distance between the medial position of said opposed axially facing wall portions being the greatest axial extent of said opening, the axial distance between said opposed axially facing wall portions on either circumferential side of said medial position decreasing to at least the diameter of the ball received in the opening, and the remainder of said opening other than said arcuately formed portions of said axially facing wall being so formed and sufficiently spaced for allowing the ball receiving in the opening to shift relatively thereto in both circumferential directions until such time as it reaches the position wherein it engages both arcuately formed axially facing wall portions of the opening.

9. A universal joint according to claim 8 wherein the distance between the opposed circumferential wall portions is greater than the distance between the opposed axial wall portions.

10. A universal joint according to claim 9 wherein the arc radius of said axial wall portions is greater than the radius of the ball to be received therein.

References Cited

UNITED STATES PATENTS

| | | | |
|---|---|---|---|
| 3,287,934 | 11/1966 | Asher | 64—21 |
| 1,665,280 | 4/1928 | Rzeppa | 64—21 |
| 2,325,460 | 7/1943 | Amberg | 64—21 |
| 2,908,151 | 10/1959 | Wahlmark | 64—21 |
| 3,133,431 | 5/1964 | Zech | 64—8 X |

FOREIGN PATENTS 956,894  4/1964  Great Britain.

HALL C. COE, *Primary Examiner.*

U.S. Cl. X.R.

308—201